UNITED STATES PATENT OFFICE.

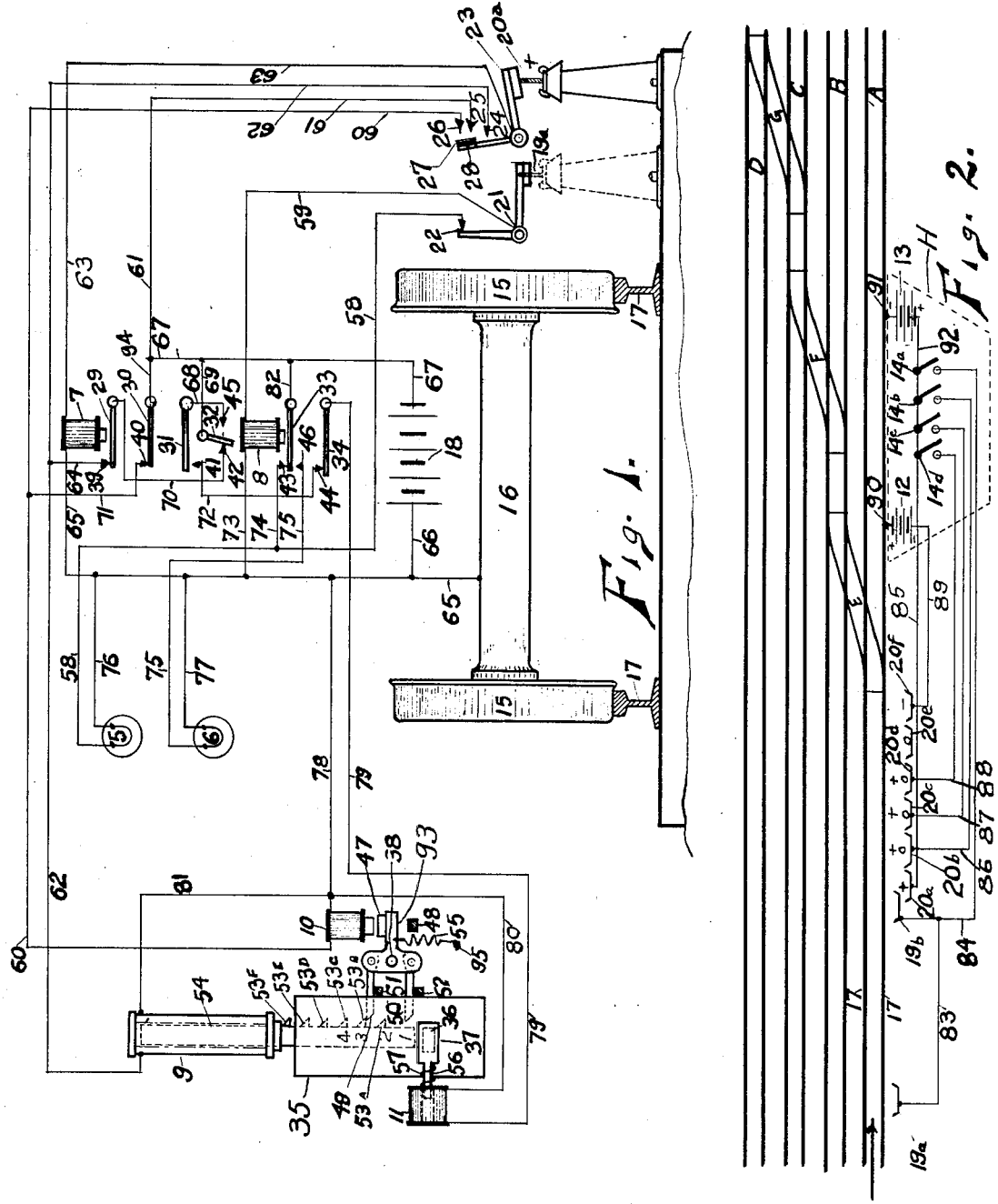

LUTHER RINGER, OF BUFFALO, NEW YORK, ASSIGNOR TO THE SIMMEN AUTOMATIC RAILWAY SIGNAL COMPANY, OF BUFFALO, NEW YORK, A CORPORATION OF ARIZONA.

CAB-SIGNAL SYSTEM.

1,351,943.      Specification of Letters Patent.      Patented Sept. 7, 1920.

Application filed May 29, 1917. Serial No. 171,612.

*To all whom it may concern:*

Be it known that I, LUTHER RINGER, a citizen of the United States, residing at Buffalo, in the county of Erie and State of New York, have invented certain new and useful Improvements in Cab-Signal Systems, of which the following is a specification.

This invention relates to a cab signal system and more specifically to a cab signal system in which cab traffic signals are combined with cab route indications.

In interlocking practice it is well known that where a plurality of routes are possible for an approaching train, fixed signals are extremely confusing to the engineer. Moreover, fixed signals are likely to be obscured by bad weather conditions and bad atmospheric conditions, and this is more likely to be the case at congested points, such as interlocking towers. One of the objects of my invention is to give the engineer in his cab a clear and unmistakable indication of the route which he is to follow at any point where a plurality of diverging routes are possible.

A further object of my invention is to combine cab traffic signals with cab route indications in such a manner that a route indication cannot be displayed in the cab unless a clear traffic signal is also displayed therein.

Other objects and advantages will appear as the description of the invention progresses, and the novel features will be particularly pointed out in the appending claims.

In describing the invention in detail, reference is had to the accompanying drawings, wherein I have illustrated a preferred physical embodiment of my invention, and wherein like characters of reference designate corresponding parts throughout the several views, and in which:

Figure 1 is a diagrammatic representation of parts of a vehicle and devices carried on the vehicle; Fig. 2 shows a four track railway together with an interlocking tower located at a point where four different routes are possible and devices for operating the cab carried signals.

In Fig. 1, there is shown the car equipment. In this figure, 17, 17 indicate the track rails, 15, 15 the wheels of the vehicle and 16 its axle. 21 is a shoe hingedly mounted at a convenient place on the vehicle and adapted to contact with the traffic signal rails $19^a$, $19^b$, etc. During such contact with a signal rail, the shoe 21 breaks contact with the contact point 22, and after leaving such signal rail is restored by gravity or spring pressure to its contact point. 23 is a shoe hingedly mounted at a convenient place on the vehicle and adapted to contact with the route indication rails $20^a$, $20^b$, etc. The shoe 23 has the contact plate 27 rigidly attached to its upper arm and insulated therefrom by the insulation 28. While the shoe 23 is contacting with a signal rail, the contact plate 27 breaks contact with the contact points 25 and 26, and the shoe 23 breaks contact with an additional contact point 24. After leaving such signal rail, gravity or spring pressure restores the shoe to its lower position, causing the contact plate 27 to again make contact with its contact points 25 and 26, and the shoe 23 to again make contact with its contact point 24. 93 is a member pivotally mounted at 38. The member 93 comprises at its right hand end an armature 47 which is adapted to be attracted by electromagnet 10, and the member 93 at its left hand end has rigidly attached thereto two dogs 49 and 50, the dog 49 being mounted above the dog 50. 55 is a spring; one end of which is rigidly fastened at the point 95, and the other end of which is attached to the right hand end of member 93. The spring 55 is in tension and tends to hold the armature 47 away from the electromagnet 10. 48 is a stop which limits the downward motion of the armature 47, and 51 and 52 are stops which limit the downward motion of the dogs 49 and 50 respectively. 35 is a box rigidly mounted at a convenient place on the vehicle. The dogs 49 and 50 project through an aperture in one side of the box 35. Mounted above the box 35 is a solenoid 9, having a co-acting plunger 54. The plunger 54 has at its lower end a series of teeth $53^a$, $53^b$, etc. The teeth $53^a$, $53^b$, etc., have a lower horizontal surface and an upper inclined surface, and are adapted to coöperate with the dogs 49 and 50 as hereinafter described. On the front of the plunger 54 are the route indications 1, 2, 3, 4, etc., which are adapted to register under certain circumstances with an aperture 36 in the front of the box 35. Normally the aperture 36 is covered by the shutter 37.

Rigidly attached to one end of the shutter 37 is a plunger 56, which is adapted to be attracted by the solenoid 11 to withdraw the shutter 37 from the aperture 36 when the solenoid 11 is energized. The compression spring 57 normally holds the shutter 37 over the aperture 36.

8 is the cab traffic relay. The relay 8 has two neutral armatures 33 and 34 which are adapted, when the relay 8 is energized, to touch the contacts 43 and 44 respectively. When the relay 8 is deënergized the armature 33 is adapted to touch the contact 46. The relay 8 is connected by the wire 59 with the shoe 21 and by the wires 73 and 65 with the axle 16 of the vehicle. 7 is the route indication relay. The relay 7 has three neutral armatures 29, 30 and 31 and a polarized armature 32. When the relay 7 is energized the armatures 29 and 30 are adapted to touch the contacts 39 and 40 respectively and when the relay 7 is deënergized the armature 31 is adapted to touch the contact 41. When the relay 7 is positively energized, the polarized armature 32 is adapted to touch the contact 42 and when the relay 7 is negatively energized the polarized armature 32 is adapted to touch the contact 45. The polarized armature 32 is so designed that it will remain in any position in which it has been placed until its position is changed by the flow of current of opposite polarity. The relay 7 is connected by the wire 63 with the shoe 23 and by the wire 65 with the axle 16 of the vehicle. 5 is a clear traffic signal or green light. 6 is a danger traffic signal or red light. 18 is a local battery mounted on the vehicle. The parts described are suitably connected by electrical wires or conductors, which will be more fully described in the description of the electrical circuits hereinafter set forth.

In Fig. 2, there is shown the track equipment, A, B, C and D are four tracks of a railway, the normal direction of traffic on the track A being from left to right as shown by the arrow. E is a cross-over from track A to track B. F is a cross-over from track B to track C. G is a cross-over from track C to track D. H is an interlocking tower located near the cross-over E. It will be obvious that a train approaching on track A may take any one of four different routes. (1) It may proceed on track A. (2) It may take the cross-over E and proceed on track B. (3) It may take the cross-overs E and F and proceed on track C. (4) It may take the cross-overs E, F and G and proceed on track D.

In the interlocking tower H are two batteries 12 and 13. The battery 12 has its positive side connected by a wire 90 with the track rail of the track A, and the battery 13 has its negative side connected by wire 91 with the track rail of the track A. Also located in the interlocking tower H are the electrical switches $14^a$, $14^b$, $14^c$ and $14^d$ for making or breaking electrical circuits as will be hereinafter described. It will be understood by those skilled in the art that these switches may be suitably connected with the interlocking apparatus so that it is impossible for the operator to set up the signal for a given route until the track apparatus is in proper condition for that route.

Located at a suitable distance from the interlocking tower H are the traffic signal rails $19^a$, $19^b$, etc., and the route indication signal rails $20^a$, $20^b$, etc. The traffic signal rails $19^a$, $19^b$, etc. are located at a different lateral distance from the track rails of the track A than the route indication signal rails $20^a$, $20^b$, etc. The signal rail $19^a$ is a distant rail and the signal rail $19^b$ is a home rail. The operator in the tower can connect these two signal rails with the positive side of the battery 13 by closing the switch $14^a$, through the following circuit—from the positive side of the battery 13 to the wire 92, switch $14^a$, wire 84, wire 83, to the signal rails $19^a$ and $19^b$. It will be understood that the operation of the switch $14^a$ may, if so desired, be controlled partially from another interlocking tower as is well known in the art of controlled manual block systems, or the switch $14^a$ may be the front contact of a track relay of an automatic block system controlled by continuous track circuits which are well known in the art.

I will now describe the functions of the various route indication signal rails. The rail $20^a$ is a resetting rail and is always positively energized by means of the following circuit: from the positive side of the battery 13 to the wire 92, wire 85, signal rail $20^a$. The signal rails $20^b$, $20^c$, $20^d$ and $20^e$ are setting rails and are adapted to be energized or deënergized as follows: The rail $20^b$ is deënergized when the switch $14^b$ is open and is positively energized when the switch $14^b$ is closed, through the following circuit: from the positive side of the battery 13 to the wire 92, switch $14^b$, wire 86 to the signal rail $20^b$. The signal rail $20^c$ is deënergized when the switch $14^c$ is open and is positively energized when the switch $14^c$ is closed, through the following circuit: from the positive side of the battery 13 to the wire 92, switch $14^c$, wire 87 to the signal rail $20^c$. The signal rail $20^d$ is deënergized when the switch $14^d$ is open and is positively energized when the switch $14^d$ is closed, through the following circuit: from the positive side of the battery 13 to the wire 92, switch $14^d$, wire 88, signal rail $20^d$. The signal rail $20^e$ is permanently deënergized. The signal rail $20^f$ is the indication rail and is permanently negatively energized through the following circuit: from the negative side of the battery 12 to the wire 89 to the signal rail 20$^f$.

The operation of this device is as follows: When the vehicle is in such a position that its shoe 21 is resting upon a positively energized signal rail 19$^a$ or 19$^b$, the relay 8 is energized through the following circuit: from the positive side of the battery 13 to the wire 92, wire 84, wire 83, signal rail 19$^a$, shoe 21, wire 59, relay 8, wire 73, wire 65, axle 16, wheels 15, rails 17, wire 91 to the negative side of the battery 13. This causes the clear traffic signal 5 to burn through the following circuit: from the positive side of the battery 18 to the wire 67, wire 82, armature 33, contact 43, wire 74, wire 58, signal lamp 5, wire 76, wire 65, wire 66 to the negative side of the battery 18.

Upon leaving the positively energized signal rail 19$^a$, the shoe 21 will be lowered to again make contact with its contact point 22 and the relay 8 will remain energized through the following circuit: from the positive side of the battery 18 to the wire 67, wire 82, armature 33, contact 43, wire 74, wire 58, contact 22, shoe 21, wire 59, relay 8, wire 73, wire 65, wire 66 to the negative side of the battery 18. It is thus seen that upon leaving a positively energized signal rail the clear signal lamp 5 will continue to burn.

Let us now assume that the vehicle is in such a position that its shoe 21 is resting upon a deënergized signal rail 19$^a$ or 19$^b$. The holding circuit of the relay 8 will now be broken at the contact 22 and the danger signal lamp 6 will then glow through the following circuit: from the positive side of the battery 18 to the wire 67, wire 82, armature 33, contact 46, wire 75, signal lamp 6, wire 77, wire 65, wire 66 to the negative side of the battery 18.

Upon leaving such deënergized signal rail the relay 8 will remain deënergized in spite of the fact that its holding circuit is now closed at the contact 22, as its holding circuit is now broken at the contact 43.

Let us now assume that the vehicle is moving along the trackway with its relay 8 energized and therefore with the clear traffic signal 5 burning, and that it moves to such a position that its shoe 23 is contacting with the positively energized resetting rail 20$^a$. It will be observed that before reaching this signal rail, and that in fact whenever the shoe 23 is not contacting with any signal rail, the electromagnet 10 is energized through the following circuit: from the positive side of the battery 18 to the wire 67, wire 61, contact 25, contact plate 27, contact 26, wire 60, electromagnet 10, wire 78, wire 65, wire 66 to the negative side of the battery 18. Thus the armature 47 is attracted and the dogs 49 and 50 are held in their lower position. When the shoe 23 passes upon the positively energized resetting rail 20$^a$, the relay 7 becomes energized through the following circuit: from the positive side of the battery 13 to the wire 92, wire 85, signal rail 20$^a$, shoe 23, wire 63, relay 7, wire 65, axle 16, wheels 15, rails 17, wire 91 to the negative side of the battery 13. The raising of the shoe 23 breaks at the contacts 25 and 26 the energizing circuit which has heretofore been traced for the electromagnet 10, but upon the energizing of the relay 7 another energizing circuit is closed for the electromagnet 10, as follows: from the positive side of the battery 18 to the wire 67, wire 94, armature 30, contact 40, wire 71, wire 60, electromagnet 10, wire 78, wire 65, wire 66 to the negative side of the battery 18. When the relay 7 is positively energized, the solenoid 9 becomes energized through the following circuit: from the positive side of the battery 18 to the wire 67, wire 69, armature 32, contact 42, wire 70, armature 29, contact 39, wire 64, wire 62, solenoid 9, wire 81, wire 78, wire 65, wire 66 to the negative side of the battery 18. The energizing of the solenoid 9 causes the plunger 54 to be drawn to such a position that its tooth 53$^b$ is engaged by the dog 49. As the dog 49 is in its lower position, the plunger 54 will be held in this position.

After leaving the signal rail 20$^a$, the shoe 23 will be lowered to again make contact with its contact point 24 and its contact plate 27 will again make contact with its contact points 25 and 26. The relay 7 will remain energized through the following circuit: from the positive side of the battery 18 to the wire 67, wire 69, armature 32, contact 42, wire 70, armature 29, contact 39, wire 64, wire 62, contact 24, shoe 23, wire 63, relay 7, wire 65, wire 66 to the negative side of the battery 18. This will cause the condition of the solenoid 9 and the electromagnet 10 to remain the same as when the shoe 23 was on the signal rail 20$^a$.

Let us now assume that the setting rails 20$^b$, 20$^c$, 20$^d$ and 20$^e$ are all deënergized and that the vehicle has moved so that its contact shoe 23 is resting on the signal rail 20$^b$. The relay 7 will now become deënergized due to the breaking of its holding circuit at the contact 24. The solenoid 9 will also become deënergized due to the breaking of its circuit at the contact 39. The electromagnet 10 will also become deënergized due to the breaking of its circuits at the contact 40 and at the contacts 25 and 26 respectively. The deënergizing of the solenoid 9 leaves the plunger 54 free to move down by gravity except as retained by the dogs 49 and 50. The deënergizing of the electromagnet 10 causes the armature 47 to be drawn by its spring 55 to its lower position against the stop 48. The consequent upward movement of the dog 49 releases the tooth 53ᵇ from its position on this dog and causes the tooth 53ᵃ to be caught by the dog 50, thus preventing further downward motion of the plunger 54.

Upon leaving the signal rail 20ᵇ the shoe 23 will again be lowered so that its contact plate 27 will again make contact with its contact points 25 and 26, thus closing the energizing circuit of the electromagnet 10. The consequent upward movement of the armature 47 and downward movement of the dogs 49 and 50 will cause the tooth 53ᶜ to be engaged by the dog 49, and the numeral 1 to register with the aperture 36. This numeral will not be visible to the engineer however, as the aperture 36 is still covered by the shutter 37. The relay 7 and the solenoid 9 will not again be energized upon leaving the signal rail 20ᵇ as their energizing circuits are now broken at the contact 39.

Let us now assume that the vehicle has moved so that its shoe 23 is contacting with the signal rail 20ᶜ. This will again cause the electromagnet 10 to become deënergized and a corresponding downward movement of the plunger 54 will take place. Upon leaving the signal rail 20ᶜ the electromagnet 10 will again become energized and a further downward movement of the plunger 54 will take place, causing the numeral 2 to register with the aperture 36.

It will be obvious that passing the contact shoe 23 over the deënergized signal rail 20ᵈ will, in the same way, cause the numeral 3 to register with the aperture 36, and that the passing of the contact shoe 23 over the deënergized signal rail 20ᵉ will cause the numeral 4 to register with the aperture 36.

Let us now assume that the vehicle has advanced so that its shoe 23 is resting on the negatively energized indication rail 20ᶠ. This will cause the relay 7 to become negatively energized through the following circuit: from the positive side of the battery 12 to the wire 90, rails 17, wheels 15, axle 16, wire 65, relay 7, wire 63, contact shoe 23, signal rail 20ᶠ, wire 89 to the negative side of the battery 12.

When the shoe 23 leaves the negatively energized signal rail 20ᶠ, the relay 7 again becomes deënergized, but the armature 32 remains in the negative position. This causes the solenoid 11 to become energized through the following circuit: from the positive side of the battery 18 to the wire 67, wire 69, armature 32, contact 45, wire 68, armature 31, contact 41, wire 72, contact 44, armature 34, wire 79, solenoid 11, wire 80, wire 78, wire 65, wire 66, to the negative side of the battery 18. This causes the shutter 37 to be withdrawn from the aperture 36 and the route indication to be displayed to the train operator.

It will be obvious that the resetting rail 20ᵃ acts to reset the route indicator. The route set up is determined by the number of deënergized setting rails which occur after the resetting has taken place. For example, it will be obvious that if the setting rail 20ᵇ were positively energized, the effect of this rail on the vehicle carried apparatus would not change the effects already produced by the resetting rail 20ᵃ. Then, if the setting rails 20ᶜ, 20ᵈ and 20ᵉ were deënergized the numeral 3 would register with the aperture 36. The indication rail 20ᶠ is for the purpose of setting the relay 7 in such a position that upon leaving this rail, the shutter 37 will be withdrawn from the aperture 36 and the indication set up, will be displayed to the train operator.

It will be observed that inasmuch as the energizing circuit of the solenoid 11 is taken through the front contact 44 of the relay 8, it is impossible for a route indication to be displayed in the cab of the vehicle unless a clear traffic signal is being carried by the vehicle.

Although I have particularly described the construction of one physical embodiment of my invention and explained the operation and principle thereof; nevertheless, I desire to have it understood that the form selected is merely illustrative, but does not exhaust the possible physical embodiments of the idea of means underlying my invention. It will be obvious to those skilled in the art that while I have shown four route indications for illustrative purposes, any number of route indications may be obtained in the cab by suitably designing the cab apparatus and providing a proper number of setting rails. The track layout, which I have shown, is merely illustrative, and I wish it understood any track layout, where a plurality of diverging routes are possible for an approaching train, would be equally appropriate.

What I claim as new and desire to secure by Letters Patent of the United States, is:

1. In a cab signal system, clear and danger traffic signals carried by a vehicle moving along a trackway, a route indicator carried by the vehicle, means for displaying a clear signal on the vehicle when safety conditions exist, means for displaying a danger signal on the vehicle when danger conditions exist, means for setting up a predetermined route indication on the vehicle as the vehicle approaches a point in the trackway where a plurality of diverging routes are possible, and means for displaying said route indication when a clear traffic signal is carried by the vehicle.

2. In a cab signal system, clear and danger traffic signals carried by a vehicle moving along a trackway, a route indicator carried by the vehicle, means for displaying a clear signal on the vehicle when safety conditions exist, means for displaying a danger signal on the vehicle when danger conditions exist, means for setting up a predetermined route indication on the vehicle as the vehicle approaches a point in the trackway where a plurality of diverging routes are possible, and means for preventing said route indication being displayed when a danger traffic signal is carried by the vehicle.

3. In a route indicator carried on a vehicle moving along a trackway, in combination; a device on the vehicle for indicating routes to be taken; means allowing unrestrained movement of said device to cancel indications but causing a step by step movement in setting up indications; means partly on the vehicle and partly on the trackway for causing the unrestrained movement to cancel indications and means partly on the vehicle and partly on the trackway for causing step by step movement of said device for setting up indications.

4. In a route indicator carried on a vehicle moving along a trackway, in combination; a device on the vehicle for indicating routes to be taken; means allowing unrestrained movement of said device to cancel indications but causing a step by step movement in setting up indications; means partly on the vehicle and partly on the trackway for causing the unrestrained movement to cancel indications and means partly on the vehicle and partly on the trackway for causing step by step movement of said device for setting up indications; and means for displaying said indications when set up.

5. In a route indicator carried on a vehicle moving along a trackway, in combination; a device on the vehicle for indicating routes to be taken; means allowing unrestrained movement of said device to cancel indications but causing a step by step movement in setting up indications; means partly on the vehicle and partly on the trackway for causing the unrestrained movement to cancel indications and means partly on the vehicle and partly on the trackway for causing step by step movement of said device for setting up indications; means on the vehicle for causing the display of a danger signal and means governed by said last mentioned means for preventing the display of the route indication.

6. In a route indicator carried on a vehicle moving along a trackway, in combination; a device on the vehicle for indicating routes to be taken; means allowing unrestrained movement of said device to cancel indications but causing a step by step movement in setting up indications; means partly on the vehicle and partly on the trackway for causing the unrestrained movement to cancel indications and means partly on the vehicle and partly on the trackway for causing step by step movement of said device for setting up indications; means on the vehicle for causing the display of a clear signal and means governed by said last mentioned means for causing the display of the route indication.

7. In combination, a system of railroad tracks and switches comprising a plurality of diverging routes, an interlocking tower located adjacent to the point of divergence for controlling said switches, a vehicle moving along the trackway, a route indicator carried by the vehicle, a series of signal rails located adjacent to the interlocking tower for controlling the vehicle carried route indicator, said series of signal rails including a normally energized re-setting rail, a series of setting rails, and an indication rail, said last mentioned rail being normally energized in a different manner from the resetting rail, and means located in the interlocking tower for energizing the setting rails in the same manner as the resetting rail or deënergizing them.

8. In a route indicator carried on a vehicle moving along a trackway, a step-by-step device on the vehicle for indicating the route to be followed, a series of signal rails arranged along the trackway, said series of signal rails including a normally energized resetting rail, a series of setting rails, which are adapted to be energized in the same manner as the resetting rail or deënergized and an indication rail normally energized in a manner different from the resetting rail, means including the resetting rail, for placing the step-by-step device in a condition preparatory to receiving an indication, means including the setting rails for actuating the step-by-step device a number of steps corresponding to the number of deenergized setting rails, and means including the indication rail for displaying the indication on the vehicle.

LUTHER RINGER.